United States Patent [19]

Anthony

[11] Patent Number: 5,619,888
[45] Date of Patent: Apr. 15, 1997

[54] REINFORCEMENT MEMBER FOR PISTON RETAINER IN A VEHICLE AUTOMATIC TRANSMISSION

[75] Inventor: William L. Anthony, Schaumburg, Ill.

[73] Assignee: Toledo Trans-Kit, Inc., Toledo, Ohio

[21] Appl. No.: 503,220

[22] Filed: Jul. 17, 1995

[51] Int. Cl.⁶ .................................................. F16H 57/02
[52] U.S. Cl. .................................. 74/606 R; 92/171.1
[58] Field of Search ................ 74/606 R; 92/171.1; 52/309.2, 787.1, 673; 49/460; 248/903, 299.1

[56] References Cited

U.S. PATENT DOCUMENTS

| | | | |
|---|---|---|---|
| 1,456,171 | 5/1923 | Woodward | 92/171.1 |
| 3,339,270 | 9/1967 | Walton et al. | 74/606 R X |
| 3,931,748 | 1/1976 | Tertinek et al. | 74/606 R |
| 4,210,034 | 7/1980 | Younger | 74/606 R |
| 4,232,496 | 11/1980 | Warkentin | 52/309.2 X |
| 4,449,426 | 5/1984 | Younger | 74/606 R X |
| 4,782,719 | 11/1988 | Yarnell | 74/606 R |
| 4,995,971 | 2/1991 | Droste et al. | 74/606 R X |
| 5,035,155 | 7/1991 | Robledo | 74/606 R X |
| 5,199,677 | 4/1993 | Sessions | 248/299.1 X |

OTHER PUBLICATIONS

Chrysler Technical Bulletin No. 41TE (A–604), 1994.

Primary Examiner—Charles A. Marmor
Assistant Examiner—Mary Ann Battista
Attorney, Agent, or Firm—MacMillan, Sobanski & Todd

[57] ABSTRACT

A reinforcement member for a cylinder in a vehicle automatic transmission is in the form of a plate having a top surface generally parallel to a bottom surface. An edge surface circumscribes and is generally perpendicular to the top and bottom surfaces. The top and bottom surfaces have two opposed concentric arcuate sides and two opposed rounded ends. The radius of the first arcuate side is smaller than the radius of the second arcuate side. Two fastener holes extend from the top surface to the bottom surface near each rounded end. An apply hole for the flow of hydraulic fluid extends frown the top surface to the bottom surface between the fastener holes.

14 Claims, 5 Drawing Sheets

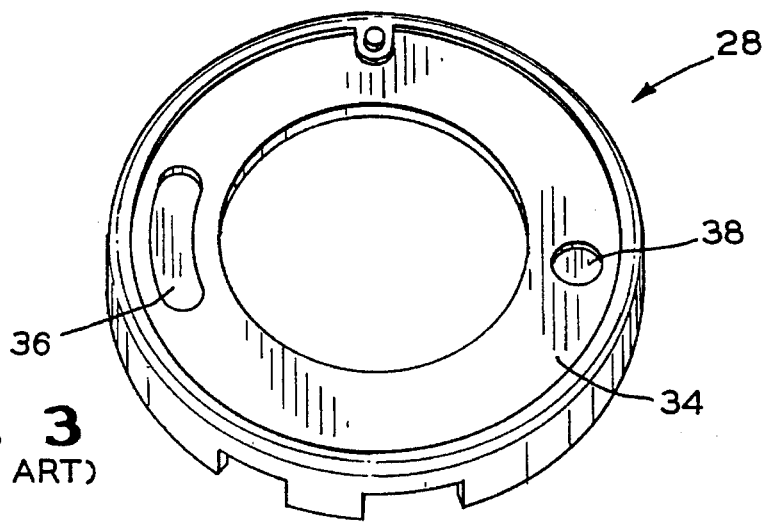
FIG. 3
(PRIOR ART)
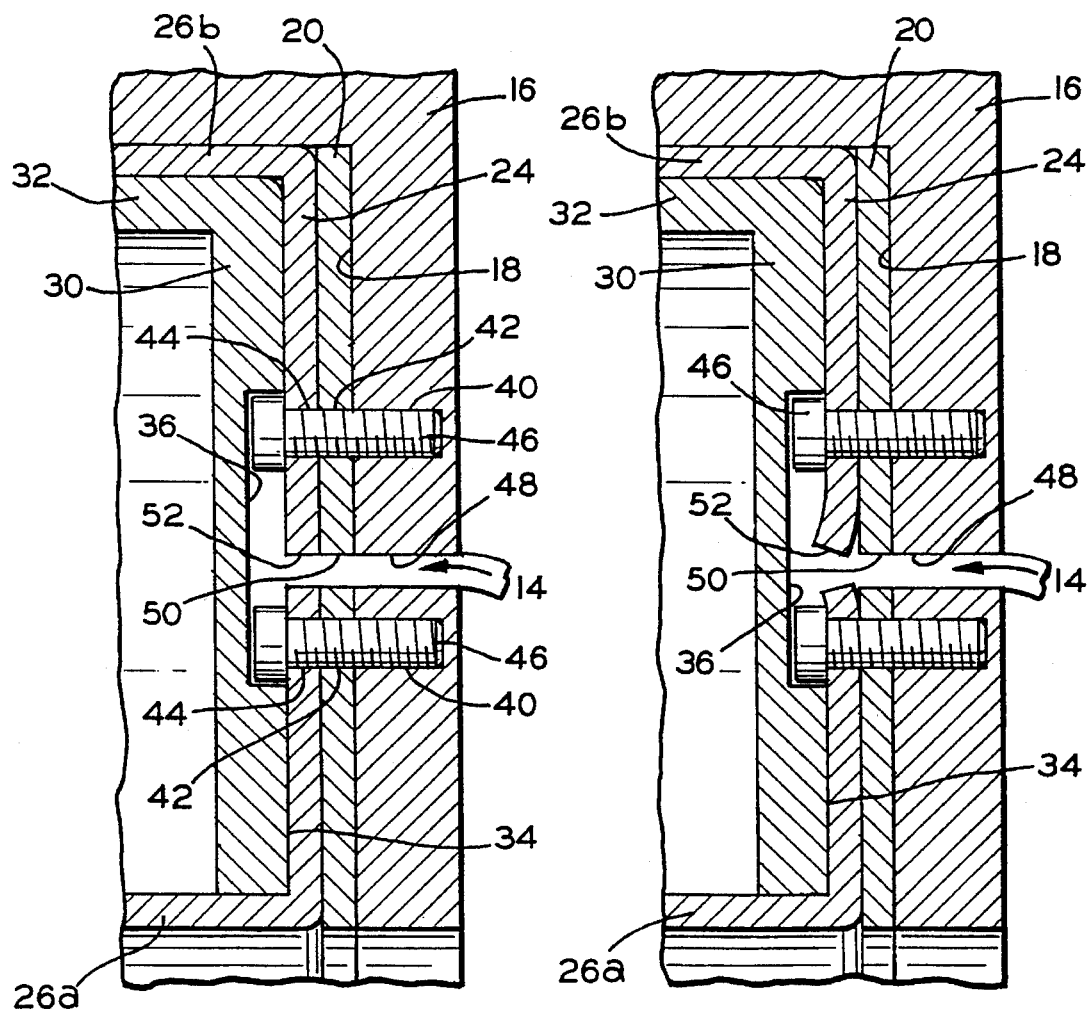
FIG. 4
(PRIOR ART)
FIG. 5
(PRIOR ART)

REINFORCEMENT MEMBER FOR PISTON RETAINER IN A VEHICLE AUTOMATIC TRANSMISSION

BACKGROUND OF THE INVENTION

This invention relates in general to automatic transmissions for vehicles and in particular to a reinforcement member for a cylinder in such a vehicular automatic transmission.

In most vehicles, a transmission is provided in the drive train between the engine and the driven wheels. As is well known, the transmission includes a case containing an input shaft, an output shaft, and a plurality of meshing gears which are selectively connected between the input shaft and the output shaft. The meshing gears contained within the transmission case are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission. Movement of the control member causes certain ones of the meshing gears to be connected between the input shaft and the output shaft so as to provide the desired gear ratio therebetween. In a manual transmission, movement of the control member is accomplished by manual exertion of the vehicle driver, such as through a shift lever. In an automatic transmission, movement of the control member is usually accomplished by a hydraulic actuator in response to predetermined operating conditions.

A typical automatic transmission includes a plurality of control members which are selectively actuated so as to engage different gear ratios for use. In one automatic transmission which is in common use, a low-reverse clutch piston is provided as one of the control members. Movement of the low-reverse clutch piston functions to control the operation of the transmission in either a low gear ratio or reverse gear ratio. The low-reverse piston is disposed within a cylinder for axial reciprocating movement. The cylinder, in turn, is disposed within an annular recess formed in the rear wall of the transmission case. A gasket is provided between the adjacent surfaces of the cylinder and the recess to provide a fluid-tight seal therebetween. The cylinder to the rear wall of the transmission case by a plurality of threaded fasteners which extend through respective apertures formed through the cylinder and the gasket. A feed opening is formed through the cylinder and the gasket to permit pressurized hydraulic fluid to be introduced within the cylinder so as to cause movement of the piston and, consequently, selective engagement of the low and reverse gear ratios.

During use, the magnitude of the pressure exerted by the hydraulic fluid can rise up to about 250 pounds per square inch. Unfortunately, it has been found that such high pressures can cause the portion of the cylinder located about the feed opening to flex or distort. This distortion causes this relatively small annular portion of the cylinder to lose firm contact with the gasket. As a result, undesirable leakage of hydraulic fluid can occur. The leakage reduces the pressure of the hydraulic fluid flowing against the piston and can result in operational problems with the transmission such as, for example, delayed gear engagement, gear slippage, or noise. Thus, it would be desirable to provide an automatic transmission which avoids the problem of distortion of the cylinder and the resultant leakage of hydraulic fluid. It would also be desirable to avoid the distortion problem without requiring modification of the cylinder or piston, allowing easy repair of existing automatic transmissions now in service.

SUMMARY OF THE INVENTION

This invention relates to a reinforcement member for a cylinder in a vehicle automatic transmission. The reinforcement member includes a plate having a top surface generally parallel to a bottom surface, and an edge surface circumscribing and generally perpendicular to the top and bottom surfaces. The top and bottom surfaces have two opposed concentric arcuate sides and two opposed rounded ends. The radius of the first arcuate side is smaller than the radius of the second arcuate side. Two countersunk fastener holes extend from the top surface to the bottom surface near each rounded end. An apply hole for the flow of hydraulic fluid extends from the top surface to the bottom surface between the fastener holes. A vehicle automatic transmission in accordance with this invention includes a transmission case having an annular recess formed in its rear wall. A cylinder is disposed within the recess. A gasket is provided between the cylinder and the recess. The cylinder and gasket each include three fastener holes. The cylinder and gasket also each include an apply hole positioned between two of the fastener holes. The reinforcement member is disposed on the cylinder so that its fastener holes and apply hole are aligned with two fastener holes and the apply hole of the cylinder. Threaded fasteners are inserted through the fastener holes to secure the reinforcement member, cylinder, and gasket within the recess of the transmission case. An annular piston is disposed within the cylinder. The piston includes an arcuate recessed area which fits over the reinforcement member. The apply holes in the cylinder, gasket and transmission case allow the flow of hydraulic fluid from the rear of the transmission case against the piston. This causes the piston to move to engage the clutch. The reinforcement member for the cylinder strengthens the area around the apply hole and fastener holes of the cylinder and thereby prevents distortion of the cylinder around the fastener holes. Thus, leakage of hydraulic fluid outside the cylinder and gasket and the operational problems associated with such leakage are prevented.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a perspective view of the rear of the piston illustrated in FIG. 2.

FIG. 4 is a cross-sectional view of the piston, cylinder, and gasket secured to the rear wall of the transmission case.

FIG. 5 is a view similar to FIG. 4 showing, in a somewhat exaggerated manner, distortion of a portion of the cylinder caused by the application of highly pressurized hydraulic fluid through the apply hole.

DETAILED DESCRIPTION OF THE PREFERRED EMBODIMENT

Figure 1:
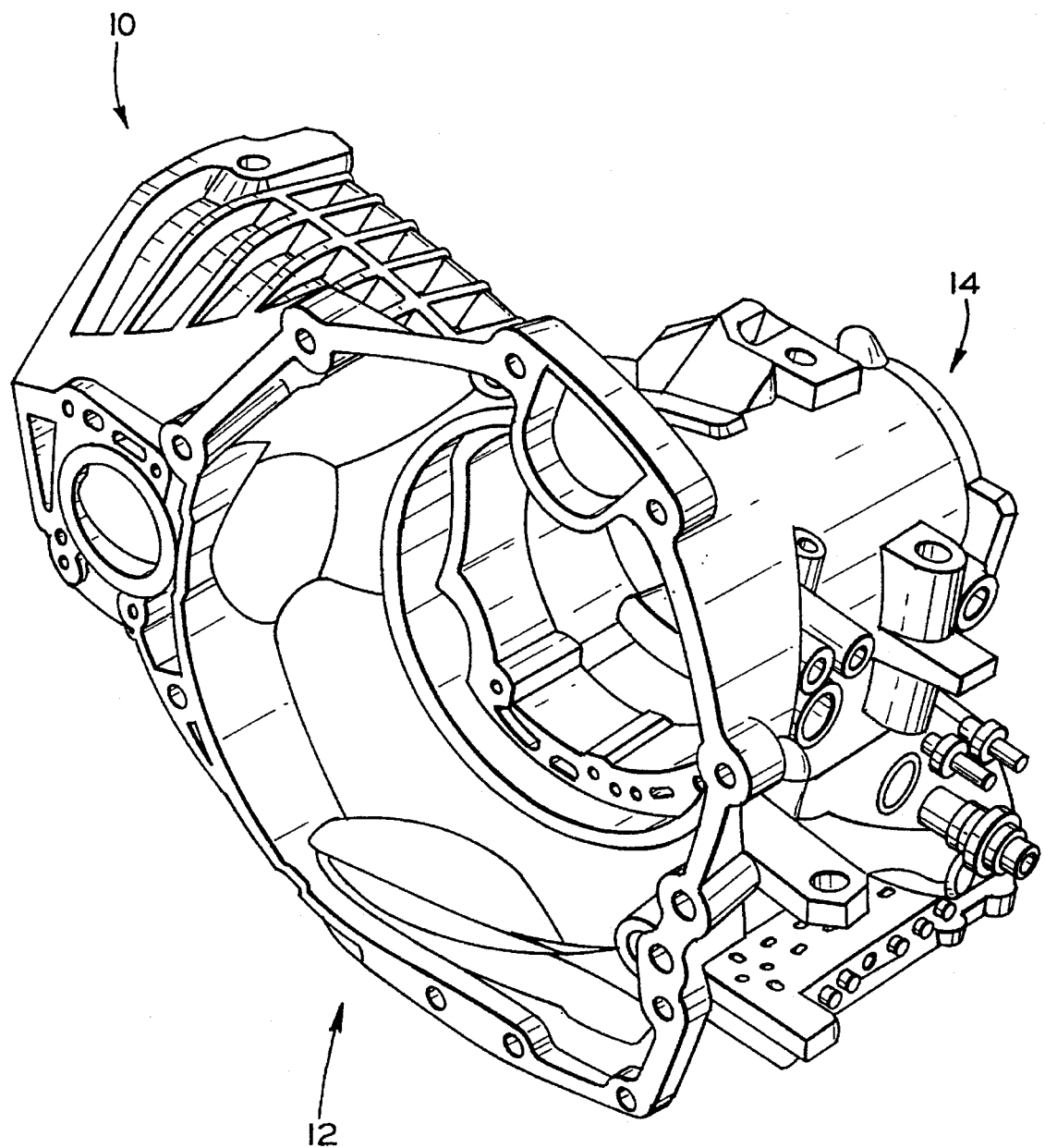
FIG. 1 is a perspective view of a conventional case for an automatic transmission adapted for use in a vehicle.

Referring now to the drawings, there is illustrated in FIG. 1 a case, indicated generally at 10, for an automatic transmission which is adapted for use in a vehicle. The illustrated transmission case 10 is conventional in the art and can be used in a Chrysler 41TE (A-604) or Chrysler 42LE (A-606) automatic transmission. However, as will become apparent below, this invention may be incorporated into other models of vehicle transmissions. The illustrated transmission case 10 is a one-piece structure which can be formed from a cast metallic material, such as aluminum alloy or steel. The transmission case 10 includes a front end, indicated generally at 12, which is open to permit assembly of the various components (not shown) therein. The transmission case 10 also includes a rear end, indicated generally at 14, which is closed.

Figure 2:
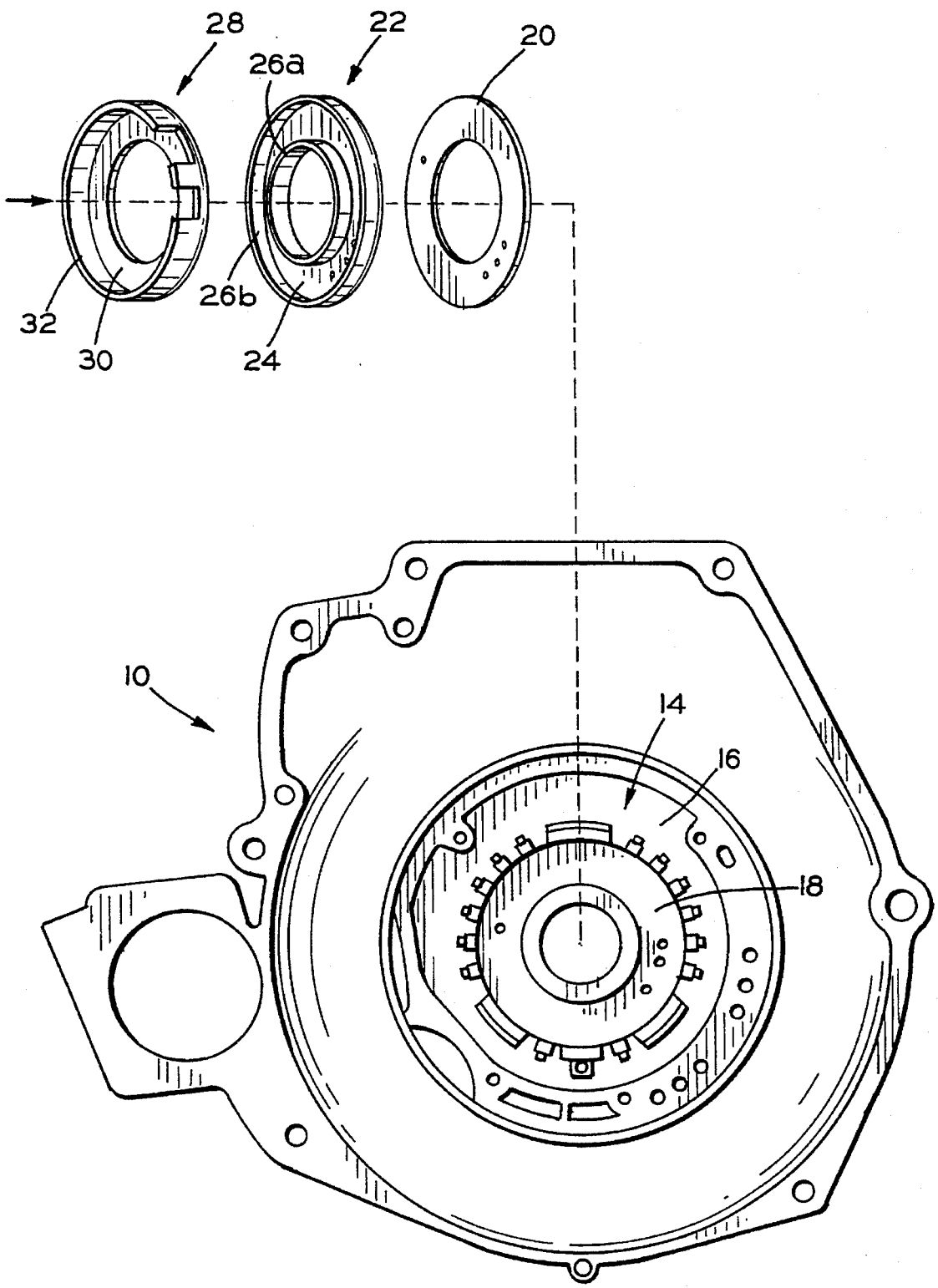
FIG. 2 is an end view of the transmission case illustrated in FIG. 1 further including a perspective view of a conventional piston, cylinder, and gasket adapted for use in the automatic transmission.

Referring now to FIG. 2, it can be seen that the rear end 14 of the transmission case 10 is closed by a rear wall 16. An annular recess 18 is formed in the rear wall 16. The surface of the recess 18 is generally flat. A gasket 20 is disposed within the recess 18. The gasket 20 is generally flat and annular in shape and is sized to fit within the recess 18. The gasket 20 can be formed from any known gasket material and is typically formed from a fibrous material. A cup-shaped cylinder, indicated generally at 22 (also referred to as a piston retainer), is disposed within the recess 18. The cylinder 22 is generally annular in shape, including a flat end surface 24 having inner and outer circumferential flanges 26a and 26b formed thereabout. The flat end surface 24 of the cylinder 22 is sized to fit against the gasket 20. The flanges 26a and 26b extend perpendicularly out from the inner and outer circumferences of the flat end surface 24 of the cylinder 22. The cylinder 22 is typically formed from a thin metallic material, such as steel.

A piston, indicated generally at 28, is disposed within the cylinder 22. The piston 28 is generally annular in shape, including a flat end portion 30 having inner and outer circumferences. A flange 32 is formed integrally with the outer circumference of the ring portion 30 of the piston 28. The piston 28 is sized to fit between the flanges 26 of the cylinder 22, and against the ring portion 24 of the cylinder 22. The piston 28 is typically formed from a metallic material, such an aluminum alloy. As best shown in FIG. 3, the piston 28 includes a rear surface 34 which faces toward the flat end surface 24 of the cylinder 22. The rear surface 34 of the piston 28 has an arcuate recessed area 36 formed therein. Also, a somewhat smaller circular recessed area 38 is formed in the rear surface 34 of the piston 28.

FIG. 4 shows the gasket 20, the cylinder 22, and the piston 28 assembled within the recess 18 formed in the rear wall 16 of the transmission case 10. As shown therein, the gasket 20 is disposed within the recess 18, and the cylinder 22 is disposed within the recess 18 over the gasket 20. Fastener holes 40 and 42 are formed in each of the rear wall 16, the gasket 20, and the cylinder 22, all aligned with one another. Threaded fasteners 46 are inserted into the fastener holes 40 and 42 to secure the cylinder 22 and the gasket 20 to the rear wall 16 of the transmission case 10. Then, the piston 28 is disposed within the cylinder 22. The recessed area 36 of the piston 28 provides space for the heads of the threaded fasteners 46. A third fastener hole (not shown) is also formed in each of the rear wall 16, the gasket 20, and the cylinder 22, all aligned with one another. A threaded fastener (not shown) is inserted into the third fastener hole to secure the cylinder 22 and the gasket 20 to the rear wall 16 of the transmission case 10. The recessed area 38 of the piston 28 provides space for the head of the third threaded fastener.

Apply holes 48, 50, and 52 are formed, respectively, in each of the rear wall 16, the gasket 20 and the cylinder 22. The apply holes 48, 50, and 52 are aligned with one another, as shown in FIG. 4. Pressurized hydraulic fluid flows from a source (not shown) through the rear end 14 of the transmission case 10, and the gasket 20 into the cylinder 22. When applied, the pressurized hydraulic fluid causes the piston 28 to move forwardly (toward the left in FIG. 4). When released, a return mechanism (now shown) causes the piston 28 to move rearwardly (toward the right in FIG. 4). In this manner, the low-reverse clutch (not shown) of the transmission is operated. FIG. 5 illustrates a known problem encountered when the pressurized hydraulic fluid flows through the apply holes 48, 50, and 52. The high pressure hydraulic fluid can distorts the portion of the flat end surface 24 of the cylinder 22 located about the apply hole 52 formed therethrough. This distortion bends out this portion of the flat end surface, as shown in a somewhat exaggerated manner in FIG. 5, relaxing the fit of the cylinder 22 on the gasket 20. As a result, leakage of hydraulic fluid can occur outside the perimeter of the cylinder 22 and gasket 20.

Figure 6:
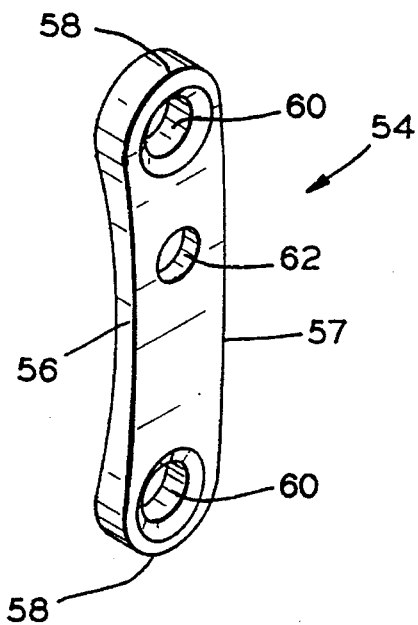
FIG. 6 is a perspective view of a reinforcement member in accordance with this invention.
Figure 7:
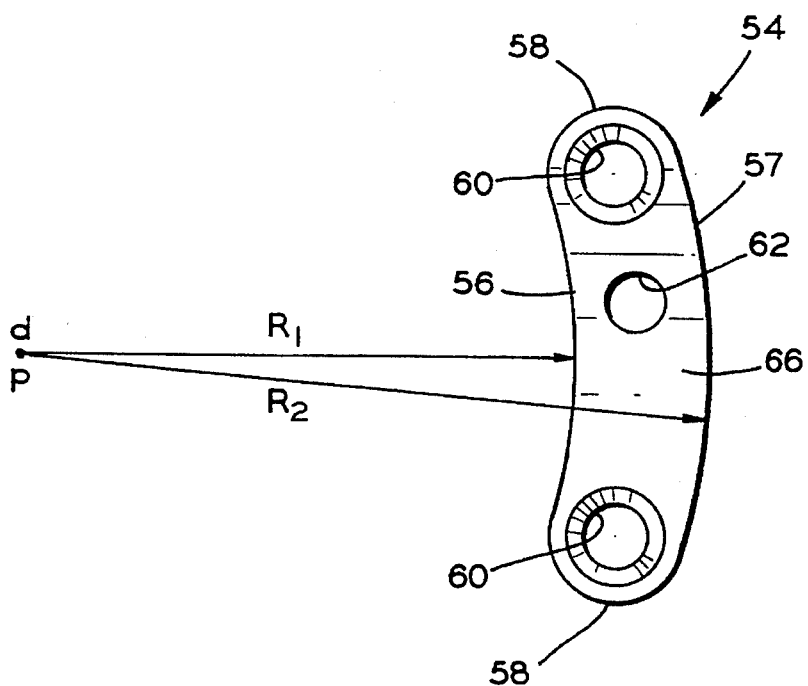
FIG. 7 is an enlarged top view of the reinforcement member illustrated in FIG. 6.
Figure 8:
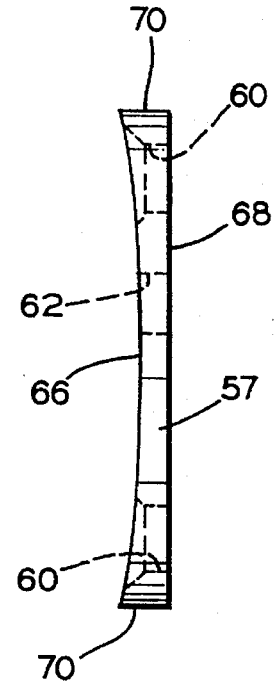
FIG. 8 is an enlarged side cross-sectional view of the reinforcement member illustrated in FIGS. 6 and 7.

Referring now to FIGS. 6, 7, and 8, there is illustrated a reinforcement member, indicated generally at 54, in accordance with this invention. The reinforcement member 54 is a flat plate having first and second arcuate sides 56 and 57 and opposed rounded ends 58. The reinforcement member 54 includes two fastener holes 60 formed therethrough near the rounded ends 58. Each of the fastener holes 60 are countersunk, having its top part enlarged conically so that a tapered flat head fastener will lie flush with the surface. The reinforcement member 54 further includes an apply opening 62 formed therethrough. Preferably, the reinforcement member 54 is formed from a metallic material, such as steel. The reinforcement member 54 includes a top surface 66 and a bottom surface 68. As best shown in FIG. 8, the top surface 66 of the reinforcement member 54 is slightly concave relative to the bottom surface 68. The reinforcement member 54 further includes an edge surface 70 circumscribing and generally perpendicular to the top surface 66 and bottom surface 68. The first arcuate side 56 defines a radius $R_1$ about a point P which is slightly smaller than a similar radius $R_2$ defined by the second arcuate side 57.

Figure 9:
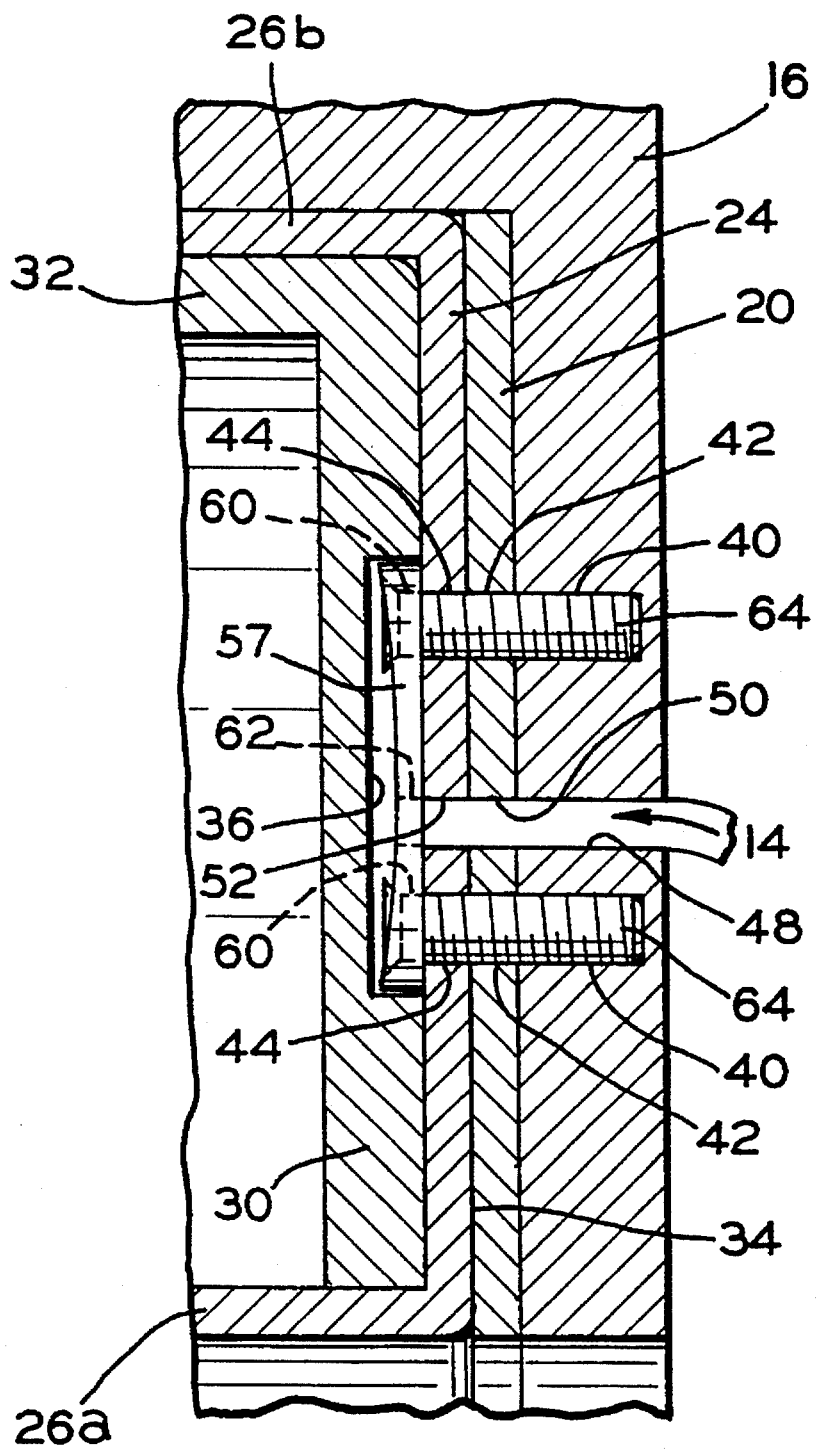
FIG. 9 is a view similar to FIG. 4 showing the reinforcement member disposed on the cylinder so as to prevent distortion thereof.

FIG. 9 is a cross-sectional view similar to FIG. 4 which shows the reinforcement member 54 secured to the cylinder 22 in accordance with this invention. As discussed above, the recess 18 is formed in the rear wall 16 of the transmission case 10, and the gasket 20 is disposed within the recess 18. The cylinder 22 is also disposed within the recess 18 adjacent to the gasket 20. The reinforcement member 54 is secured to the cylinder 22 by the threaded fasteners 64 which extend through the fastener holes 60. The threaded fasteners 64 lie generally flush with the surface of the reinforcement member 54. When secured in this manner, the bottom surface 68 of the reinforcement member 54 lies flat against the flat end surface 24 of the cylinder 22. Also, the apply opening 62 formed through the reinforcement member 54 is aligned with the aligned apply openings 48, 50, and 52 formed through the rear wall 16, the gasket 20, and the cylinder 22. When the piston 28 is disposed within the cylinder 22, the recessed area 36 provides clearance for the reinforcement member 54. Thus, the piston 28 can be properly positioned on the cylinder 22 over the reinforcement member 54. The reinforcement member 54 strengthens the area of the end surface 24 of the cylinder 22 around the apply hole 52 and around the fastener holes 44. As a result, the reinforcement member 54 prevents distortion of the cylinder 22, such as shown in FIG. 5, when pressurized hydraulic fluid flows through its apply hole 52. Thus, the reinforcement member 54 prevents leakage of hydraulic fluid outside the cylinder 22 and gasket 20 and the operational problems associated with such leakage.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fluid actuator for a vehicle automatic transmission comprising:
   a transmission case including a wall having a fluid apply opening formed therethrough;
   a gasket disposed adjacent to said wall and having a fluid apply opening formed therethrough which is aligned with said fluid apply opening formed through said wall;
   a cylinder disposed adjacent to said gasket and having a fluid apply opening
   a reinforcement member disposed adjacent to said cylinder and having a fluid apply opening formed therethrough which is aligned with said aligned fluid apply openings formed through said cylinder, said gasket, and said wall; and
   a piston disposed within said cylinder and adapted to be moved relative thereto when pressurized fluid is supplied through said aligned fluid apply openings formed through said reinforcement member, said cylinder, said gasket, and said wall.

2. The fluid actuator defined in claim 1 wherein said piston has a recess formed therein which is adapted to extend about a portion of said reinforcement member.

3. The fluid actuator defined in claim 1 wherein said reinforcement member is formed from a rigid material.

4. The fluid actuator defined in claim 1 wherein said reinforcement member is formed from a metallic material.

5. The fluid actuator defined in claim 1 wherein said reinforcement member is a plate including a top surface, a bottom surface, and an edge circumscribing said top and bottom surfaces.

6. The fluid actuator defined in claim 5 wherein said top surface extends generally parallel to said bottom surface, and wherein said edge extends generally perpendicular to said top and bottom surfaces.

7. The fluid actuator defined in claim 5 wherein said top surface is slightly concave relative to said bottom surface.

8. The fluid actuator defined in claim 5 wherein said edge includes first and second arcuate sides.

9. The fluid actuator defined in claim 8 wherein a radius defined by said first arcuate side is smaller than a radius defined by said second arcuate side.

10. The fluid actuator defined in claim 8 wherein said edge further includes first and second rounded ends.

11. The fluid actuator defined in claim 1 further including means for retaining said reinforcement member adjacent to said cylinder.

12. The fluid actuator defined in claim 11 wherein said means for retaining includes a pair of threaded fasteners extending through respective aligned fastener openings formed through said reinforcement member, said cylinder, said gasket, and said wall.

13. The fluid actuator defined in claim 11 wherein said means for retaining includes a threaded fastener extending through aligned fastener openings formed through said reinforcement member, said cylinder, said gasket, and said wall.

14. The fluid actuator defined in claim 13 wherein said threaded fastener includes a head portion, and wherein said fastener opening formed through said reinforcement member includes a countersink portion which receives said head of said threaded fastener.

* * * * *

UNITED STATES PATENT AND TRADEMARK OFFICE
CERTIFICATE OF CORRECTION

PATENT NO. : 5,619,888
DATED : April 15, 1997
INVENTOR(S) : William L. Anthony

It is certified that error appears in the above-indentified patent and that said Letters Patent is hereby corrected as shown below:

Column 5, Claim 1, Line 9, after "opening", insert -- formed therethrough which is aligned with said aligned fluid apply openings formed through said gasket and said wall; --.

Signed and Sealed this

First Day of July, 1997

*Attest:*

BRUCE LEHMAN

*Attesting Officer*  *Commissioner of Patents and Trademarks*